(12) United States Patent
Sugiura

(10) Patent No.: US 12,152,159 B2
(45) Date of Patent: Nov. 26, 2024

(54) INORGANIC OXIDE MICROPARTICLE DISPERSION

(71) Applicant: NAGASE CHEMTEX CORPORATION, Osaka (JP)

(72) Inventor: Yuki Sugiura, Hyogo (JP)

(73) Assignee: Nagase ChemteX Corporation, Osaka (JP)

( * ) Notice: Subject to any disclaimer, the term of this patent is extended or adjusted under 35 U.S.C. 154(b) by 256 days.

(21) Appl. No.: 17/058,494

(22) PCT Filed: Jun. 12, 2019

(86) PCT No.: PCT/JP2019/023210
§ 371 (c)(1),
(2) Date: Nov. 24, 2020

(87) PCT Pub. No.: WO2019/240154
PCT Pub. Date: Dec. 19, 2019

(65) Prior Publication Data
US 2021/0198513 A1    Jul. 1, 2021

(30) Foreign Application Priority Data
Jun. 15, 2018   (JP) ................. 2018-114607

(51) Int. Cl.
| | | |
|---|---|---|
| C09D 17/00 | (2006.01) | |
| C09D 7/20 | (2018.01) | |
| C09D 7/45 | (2018.01) | |
| C09D 7/61 | (2018.01) | |
| C09D 7/63 | (2018.01) | |
| C09D 7/65 | (2018.01) | |
| C09D 133/06 | (2006.01) | |
| C09D 183/04 | (2006.01) | |

(52) U.S. Cl.
CPC ............. *C09D 17/002* (2013.01); *C09D 7/20* (2018.01); *C09D 7/45* (2018.01); *C09D 7/61* (2018.01); *C09D 7/63* (2018.01); *C09D 7/65* (2018.01); *C09D 17/007* (2013.01); *C09D 17/008* (2013.01); *C09D 133/062* (2013.01); *C09D 183/04* (2013.01)

(58) Field of Classification Search
CPC ... C09D 17/002; C09D 17/007; C09D 17/008
See application file for complete search history.

(56) References Cited

U.S. PATENT DOCUMENTS

| 2016/0297946 A1 | 10/2016 | Sugiura et al. |
| 2017/0009062 A1 | 1/2017 | Kimura et al. |
| 2017/0342234 A1 | 11/2017 | Takeshita et al. |

FOREIGN PATENT DOCUMENTS

| JP | 2010-189506 | 9/2010 | |
| JP | 2011-116943 | 6/2011 | |
| JP | 2015-117157 | 6/2015 | |
| WO | 2015/046487 | 4/2015 | |
| WO | 2015/087946 | 6/2015 | |
| WO | 2015/111664 | 7/2015 | |
| WO | 2016/093014 | 6/2016 | |
| WO | WO-2016182007 A1 * | 11/2016 | ............... C08F 2/44 |

OTHER PUBLICATIONS

Machine translation of WO 2016/093014 A1, published Jun. 16, 2016, retrieved from EPO espacenet on Nov. 10, 2022. (Year: 2016).*
Machine translation of WO 2016/182007 A1, published Nov. 17, 2016.*
Machine translation of WO 2016/093014 A1, published Jun. 16, 2016, retrieves from https://worldwide.Espacenet.com on Nov. 6, 2023.*
HSP Calculations, Hansen Solubility Parameters, https://www.hansen-solubility.com/contents/HSP_Calculations.xlsx, retrieved Jun. 5, 2024, 3 pages.

* cited by examiner

*Primary Examiner* — Vicky Nerangis
(74) *Attorney, Agent, or Firm* — HSML P.C.

(57) ABSTRACT

The present invention aims to provide a method of producing a fine particulate inorganic oxide dispersion, which makes it possible to easily disperse a fine particulate inorganic oxide while reducing the amount of dispersant used. The present invention relates to a method of producing a fine particulate inorganic oxide dispersion, the method including mixing the following components (A) to (D): (A) at least one fine particulate inorganic oxide selected from the group consisting of zirconium oxide ($ZrO_2$), titanium oxide ($TiO_2$), and barium titanate ($BaTiO_3$), (B) a dispersant, (C) an alkoxysilane compound, and (D) a solvent having the following Hansen solubility parameters: a hydrogen bonding component (dH) of 11 or less and a polar component (dP) of 4 or more; and wet grinding the resulting mixture.

6 Claims, No Drawings

INORGANIC OXIDE MICROPARTICLE DISPERSION

TECHNICAL FIELD

The present invention relates to a fine particulate inorganic oxide dispersion.

BACKGROUND ART

In recent years, optical coating compositions containing fine particulate inorganic oxides with high refractive indices such as titanium oxide or zirconium oxide have been proposed and put into use in order to prevent reflection from displays and to improve light collection efficiency of optical lenses.

Such optical coating compositions may be prepared by mixing a fine particulate inorganic oxide dispersion with a curable resin while maintaining the dispersion state. When a fine particulate inorganic oxide, which has hydroxy groups on its surface and is hydrophilic, is mixed with a water-insoluble curable resin, the mixture may become cloudy due to agglomeration of the particles, or may sometimes thicken and lose fluidity. To stabilize the dispersion state of such fine particulate inorganic oxides, various methods of producing a fine particulate inorganic oxide dispersion have been proposed which include addition of a dispersant or surface treatment with a silane coupling agent. However, the use of a large amount of a dispersant, which stabilizes dispersion of fine particles and prevents their agglomeration, may reduce the light or heat resistance of the resulting thin film or molded product. Therefore, it has been desirable to disperse a fine particulate inorganic oxide while reducing the amount of dispersant used. To this end, it has been proposed to prepare a dispersion by using surface treatment with a silane coupling agent in combination or by a complicated process.

Patent Literature 1 discloses that zirconium oxide nanoparticles are dispersed with a dispersant, a dispersion medium, and a silane coupling agent. In this method, it is necessary to add an alkoxysilane in portions after the step of adding a dispersant to a fine particulate inorganic oxide.

Patent Literature 2 discloses that a fine particulate inorganic oxide is dispersed in methanol, and then the solvent is replaced with a non-alcoholic, lipophilic organic solvent. This method enables dispersion of a fine particulate inorganic oxide, but the solvent replacement step is required.

CITATION LIST

Patent Literature

Patent Literature 1: JP 2010-189506 A
Patent Literature 2: JP 2015-117157 A

SUMMARY OF INVENTION

Technical Problem

The present invention aims to provide a method of producing a fine particulate inorganic oxide dispersion, which makes it possible to easily disperse a fine particulate inorganic oxide while reducing the amount of dispersant used.

Solution to Problem

The present inventors have found that a specific solvent may be used to easily disperse a fine particulate inorganic oxide while reducing the amount of dispersant used. This finding has led to the completion of the present invention.

Specifically, the present invention relates to a method of producing a fine particulate inorganic oxide dispersion, the method including:
  mixing the following components (A) to (D):
    (A) at least one fine particulate inorganic oxide selected from the group consisting of zirconium oxide ($ZrO_2$), titanium oxide ($TiO_2$), and barium titanate ($BaTiO_3$),
    (B) a dispersant,
    (C) an alkoxysilane compound, and
    (D) a solvent having the following Hansen solubility parameters: a hydrogen bonding component (dH) of 11 or less and a polar component (dP) of 4 or more; and
  wet grinding the resulting mixture.

Preferably, a ratio by weight of the dispersant (B) to the alkoxysilane compound (C) is 20:80 to 5:95.

Preferably, a sum of the dispersant (B) and the alkoxysilane compound (C) is 5 to 40 parts by weight relative to 100 parts by weight of the fine particulate inorganic oxide (A).

The present invention also relates to a fine particulate inorganic oxide dispersion, including the following components (A) to (D):
    (A) at least one fine particulate inorganic oxide selected from the group consisting of zirconium oxide ($ZrO_2$), titanium oxide ($TiO_2$), and barium titanate ($BaTiO_3$),
    (B) a dispersant,
    (C) an alkoxysilane compound, and
    (D) a solvent having the following Hansen solubility parameters: a hydrogen bonding component (dH) of 11 or less and a polar component (dP) of 4 or more,
  wherein a ratio by weight of the dispersant (B) to the alkoxysilane compound (C) is 20:80 to 5:95.

Preferably, a sum of the dispersant (B) and the alkoxysilane compound (C) is 5 to 40 parts by weight relative to 100 parts by weight of the fine particulate inorganic oxide (A).

The present invention also relates to a resin composition, containing:
  the fine particulate inorganic oxide dispersion; and
  a binder resin.

Preferably, the fine particulate inorganic oxide is present in an amount of 30% by weight or more based on solids in the resin composition.

The present invention also relates to a cured product, obtained by curing the resin composition.

Advantageous Effects of Invention

The method of producing a fine particulate inorganic oxide dispersion of the present invention makes it possible to easily disperse a fine particulate inorganic oxide while reducing the amount of dispersant used. The coating film obtained by curing the resin composition of the present invention has good optical properties and high reliability.

DESCRIPTION OF EMBODIMENTS

<<Method of Producing Fine Particulate Inorganic Oxide Dispersion>>

The present invention relates to a method of producing a fine particulate inorganic oxide dispersion, the method including:
  mixing the following components (A) to (D):
    (A) at least one fine particulate inorganic oxide selected from the group consisting of zirconium oxide ($ZrO_2$), titanium oxide ($TiO_2$), and barium titanate ($BaTiO_3$),
    (B) a dispersant, (C) an alkoxysilane compound, and
(D) a solvent having the following Hansen solubility parameters: a hydrogen bonding component (dH) of 11 or less and a polar component (dP) of 4 or more; and wet grinding the resulting mixture.

<(A) Fine Particulate Inorganic Oxide>

The present invention uses, as the fine particulate inorganic oxide (A), at least one selected from the group consisting of zirconium oxide ($ZrO_2$), titanium oxide ($TiO_2$), and barium titanate ($BaTiO_3$) because they are easily available and their optical properties such as refractive index can be easily controlled. Preferred among these is zirconium oxide. These fine particulate inorganic oxides may be compounds doped with another element. Examples of the fine particulate inorganic oxide compounds doped with another element include tantalum-doped titanium oxides and niobium-doped titanium oxides. These fine particulate inorganic oxides may be used alone or in combinations of two or more. Moreover, the fine particulate inorganic oxides may be produced by any method.

The fine particulate inorganic oxides may have any primary particle size. The primary particle size is preferably 1 to 50 nm, more preferably 5 to 30 nm. A fine particulate inorganic oxide with a primary particle size of smaller than 1 nm has a large specific surface area and a high cohesive energy, so that its dispersion stability may be difficult to maintain. Also, a fine particulate inorganic oxide with a primary particle size of greater than 50 nm may cause intense light scattering in the thin film or molded product, so that a high level of transparency may not be maintained. The primary particle size can be determined with an electron microscope such as SEM or TEM or converted from the specific surface area.

The fine particulate inorganic oxide(s) in the dispersion of the present invention preferably has an average particle size of 10 to 70 nm, more preferably 10 to 50 nm. For an average particle size of smaller than 10 nm, it is necessary to use particles having a small primary particle size, which may be difficult to disperse. Also, a dispersion with an average particle size of greater than 70 nm may cause cloudiness when it is used to form a cured product such as a thin film or molded product. The secondary particle size can be measured using an apparatus based on dynamic light scattering, laser diffraction, or other methods.

The amount of the fine particulate inorganic oxide(s) is preferably 5 to 80% by weight, more preferably 10 to 70% by weight, still more preferably 20 to 65% by weight, most preferably 30 to 65% by weight, based on the total dispersion. With an amount within the range indicated above, sufficient optical properties can be provided, and film forming properties can be maintained.

<(B) Dispersant>

The dispersant may be any one that allows the fine particulate inorganic oxide(s) to be dispersed in the solvent described later. Examples include polyacrylic acid dispersants, polycarboxylic acid dispersants, phosphoric acid dispersants, and silicone dispersants.

An example of a polyacrylic acid dispersant is sodium polyacrylate. Examples of such commercial products include ARON series (Toagosei Co., Ltd.) and SHALLOL series (DKS Co. Ltd.).

Examples of polycarboxylic acid dispersants include acidic ones not neutralized with cations, and polycarboxylic acid ammonium salts. Examples of such commercial products include AH-103P (DKS Co. Ltd.); SN-DISPERSANT 5020 and SN-DISPERSANT 5468 (San Nopco Limited); POIZ 532A and POIZ 2100 (Kao Corporation); and MALIALIM AKM-0531, MALIALIM AKM-1511-60, MALIALIM HKM-50A, and MALIALIM HKM-150A (NOF Corporation).

Examples of phosphoric acid dispersants include polyoxyethylene alkyl ether phosphates. Examples of such commercial products include PHOSPHANOL RA-600 and ML-220 (Toho Chemical Industry Co., Ltd.), and DISPARLON PW-36 (Kusumoto Chemicals, Ltd.).

Examples of silicone dispersants include modified silicone oils. Examples of such commercial products include ES-5612 (Dow Corning Toray Co., Ltd.).

The amount of dispersant used is preferably 0.25 to 8 parts by weight, more preferably 0.5 to 7 parts by weight, still more preferably 1 to 5 parts by weight, relative to 100 parts by weight of the fine particulate inorganic oxide(s). With the dispersant in an amount of less than 0.25 parts by weight, the fine particulate inorganic oxide(s) may not be sufficiently dispersed. With the dispersant in an amount of more than 8 parts by weight, the resulting processed product such as thin film or molded product may have lower light or heat resistance, and the properties of the fine particulate inorganic oxide(s) may not be sufficiently provided.

<(C) Alkoxysilane Compound>

The alkoxysilane compound may be added in order to increase the compatibility between the fine particulate inorganic oxide(s) and the binder resin to be mixed with the dispersion. When the dispersion of the present invention is exposed to acidic or alkaline conditions, the hydroxy groups on the surface of the fine particulate inorganic oxide(s) will react with the alkoxysilane compound so that the fine particulate inorganic oxide(s) is surface treated.

The alkoxysilane compound is preferably a compound represented by the following formula (I):

$$SiR_4 \qquad\qquad\qquad\qquad (I)$$

wherein each R is hydrogen, a hydroxy group, a C1-C4 alkoxy group, an optionally substituted alkyl group, or an optionally substituted phenyl group, provided that at least one of the four R groups is a C1-C4 alkoxy group or a hydroxy group.

Specific examples of the alkoxysilane compound include trialkoxysilanes such as 3-methacryloxypropyltrimethoxysilane, 3-glycidoxypropyltrimethoxysilane, phenyltrimethoxysilane, vinyltrimethoxysilane, 2-(3,4-epoxycyclohexyl)ethyltrimethoxysilane, p-styryltrimethoxysilane, 3-acryloxypropyltrimethoxysilane, N-2-(aminoethyl)-3-aminopropylmethyldimethoxysilane, 3-ureidopropyltriethoxysilane, 3-mercaptopropylmethyldimethoxysilane, bis(triethoxysilylpropyl)tetrasulfide, and 3-isocyanatopropyltriethoxysilane; and dialkoxysilanes such as 3-methacryloxypropylmethyldimethoxysilane, dimethyldimethoxysilane, and diphenyldimethoxysilane. These may be used alone or in combinations of two or more. Preferred among these are trialkoxysilanes, with 3-methacryloxypropyltrimethoxysilane, 3-glycidoxypropyltrimethoxysilane, and phenyltrimethoxysilane being more preferred.

The amount of the alkoxysilane compound is preferably 4 to 50 parts by weight, more preferably 6 to 38 parts by weight, still more preferably 8 to 20 parts by weight, relative to 100 parts by weight of the fine particulate inorganic oxide(s). With the alkoxysilane compound in an amount of less than 4 parts by weight, the fine particulate inorganic oxide(s) may be difficult to uniformly disperse. With the alkoxysilane compound in an amount of more than 50 parts by weight, the inorganic oxide(s) may not be highly loaded, failing to obtain target properties.

The ratio by weight of the dispersant (B) to the alkoxysilane compound (C) in the dispersion is preferably 20:80 to 5:95, more preferably 18:82 to 7:93, still more preferably 18:82 to 9:91. When the ratio by weight is less than 80 of the alkoxysilane compound to 20 of the dispersant, the dispersant may be excessive, which may cause the resulting processed product such as thin film or molded product to have deteriorated properties. When the ratio by weight is more than 95 of the alkoxysilane compound to 5 of the dispersant, it may be difficult to prepare a uniform dispersion.

The present invention uses a specific solvent to easily disperse the fine particulate inorganic oxide(s) while reducing the amount of the dispersant. The sum of the dispersant (B) and the alkoxysilane compound (C) is preferably 5 to 40 parts by weight, more preferably 7 to 35 parts by weight, still more preferably 10 to 30 parts by weight, relative to 100 parts by weight of the fine particulate inorganic oxide (A). When the sum of the dispersant (B) and the alkoxysilane compound (C) is less than 5 parts by weight relative to 100 parts by weight of the fine particulate inorganic oxide (A), the fine particulate inorganic oxide may not be sufficiently dispersed. When the sum is more than 40 parts by weight, the optical coating film, optical element, molded product, or the like produced from the dispersion may have lower refractive index or light or heat resistance.

<(D) Solvent>

The present invention uses a solvent having the following Hansen solubility parameters: a hydrogen bonding component (dH) of 11 or less and a polar component (dP) of 4 or more. This makes it possible to form a stable fine particulate inorganic oxide dispersion while reducing the amount of dispersant used. Moreover, when a fine particulate inorganic oxide is to be dispersed in a solvent that does not satisfy the above requirements, it is necessary to first add a dispersant to the fine particulate inorganic oxide, followed by adding an alkoxysilane in portions, and to disperse them in an alcoholic solvent, followed by replacing the solvent with a non-alcoholic, lipophilic organic solvent. In the solvent according to the present invention, in contrast, the fine particulate inorganic oxide, dispersant, and alkoxysilane compound can be finely dispersed, even when they are added all at once, and no solvent replacement is required after dispersing them. Thus, the dispersing step can be simplified.

The Hansen solubility parameters are intended to express Hildebrand solubility using the three parameters: dispersion (dD), polar (dP), and hydrogen bonding (dH) components. The dispersion (dD), polar (dP), and hydrogen bonding (dH) components are material-specific properties. For example, these parameters are shown in "Hansen Solubility Parameters: A User's Handbook, HSPiP 3rd Edition ver. 3.0.20".

In the present invention, the Hansen solubility parameters of the solvent include a hydrogen bonding component (dH) of 11 or less. With a dH of more than 11, it may be difficult to form a well-dispersed dispersion. The lower limit of the hydrogen bonding component (dH) is not limited, but is usually 3 or more.

The Hansen solubility parameters of the solvent include a polar component (dP) of 4 or more, more preferably of 5 or more. With a dP of less than 4, it may be difficult to form a well-dispersed dispersion. The upper limit of the polar component (dP) is not limited, but is usually 13 or less.

The Hansen solubility parameters of the solvent may include any dispersion component (dD). The dD is preferably 14 to 20.

Examples of the solvent having the Hansen solubility parameters: a hydrogen bonding component (dH) of 11 or less and a polar component (dP) of 4 or more include propylene glycol monomethyl ether acetate, methyl isobutyl ketone, cyclopentanone, methyl ethyl ketone, and tetrahydrofuran. These solvents may be used alone, or two or more of these solvents may be used in admixture as long as the mixture satisfies the above-defined Hansen solubility parameters. In the case of a solvent mixture, the solvent mixture may contain a solvent which alone does not satisfy the above-defined Hansen solubility parameters, and the hydrogen bonding (dH) and polar (dP) components of the Hansen solubility parameters of the solvent mixture may be adjusted to 11 or less and 4 or more, respectively, by controlling the blending ratio of the solvents. Examples of the solvent which alone does not satisfy the above-defined Hansen solubility parameters but may be used as a constituent of the solvent mixture include propylene glycol monomethyl ether, isopropanol, toluene, methanol, and water.

Among the solvents, propylene glycol monomethyl ether acetate, methyl isobutyl ketone, and cyclopentanone are preferred as solvents usable alone. A preferred solvent mixture is a solvent mixture of cyclopentanone and propylene glycol monomethyl ether in a ratio of 50:50 (by weight).

The amount of solvent used is preferably 30 to 900 parts by weight, more preferably 50 to 400 parts by weight, still more preferably 60 to 400 parts by weight, relative to 100 parts by weight of the fine particulate inorganic oxide(s). With an amount of less than 30 parts by weight, the viscosity may increase, causing difficulty in dispersing. With an amount of more than 900 parts by weight, the solids concentration may be reduced, so that the fine particulate inorganic oxide(s) may not be highly loaded, failing to obtain target properties.

<Optional Components>

The fine particulate inorganic oxide dispersion may optionally contain additional components in addition to the above-described components. Examples of such additional components include inorganic fine particles other than the fine particulate inorganic oxide (A), acrylate monomers, and epoxy resins.

Examples of the inorganic fine particles other than the fine particulate inorganic oxide (A) include fine particulate metal oxides such as silicon oxide ($SiO_2$), aluminum oxide ($Al_2O_3$), iron oxide ($Fe_2O_3$, FeO, $Fe_3O_4$), copper oxide (CuO, $Cu_2O$), zinc oxide (ZnO), yttrium oxide ($Y_2O_3$), niobium oxide ($Nb_2O_5$), molybdenum oxide ($MoO_3$), indium oxide ($In_2O_3$, $In_2O$), tin oxide ($SnO_2$), tantalum oxide ($Ta_2O_5$), tungsten oxide ($WO_3$, $W_2O_5$), lead oxide (PbO, $PbO_2$), bismuth oxide ($Bi_2O_3$), cerium oxide ($CeO_2$, $Ce_2O_3$), antimony oxide ($Sb_2O_5$, $Sb_2O_5$), and germanium oxide ($GeO_2$, GeO); composite oxides containing two or more metal elements, such as titanium/silicon composite oxides and yttria-stabilized zirconia; and non-oxide inorganic fine particles such as gold, silver, copper, and semiconductor fine particles. Examples of the composite oxides include not only compounds or solid solutions containing multiple elements but also those having a core-shell structure in which the periphery of a metal oxide fine particle as the core is coated with a metal oxide containing another metal element, and those having a multicomponent dispersion structure, e.g., in which one fine particulate metal oxide contains multiple other fine particulate metal oxides dispersed therein. The amount of the inorganic fine particles other than the fine particulate inorganic oxide (A), if present, is not limited and may be appropriately adjusted based on the amount of the fine particulate inorganic oxide (A).

<Mixing Step>

The fine particulate inorganic oxide (A), dispersant (B), alkoxysilane compound (C), and solvent (D) may be mixed in any order. To the solvent may be added the fine particulate inorganic oxide, dispersant, and alkoxysilane compound in any order. These components may be added all at once because the solvent according to the present invention allows the fine particulate inorganic oxide to be easily dispersed.

<Wet Grinding Step>

In the wet grinding step, the mixture obtained in the mixing step is wet-ground. The grinding of the fine particulate inorganic oxide and the dispersing of the ground product can be simultaneously performed by wet grinding in the solvent having the Hansen solubility parameters: a hydrogen bonding component (dH) of 11 or less and a polar component (dP) of 4 or more. Examples of the wet grinding mill used in the wet grinding step include ball mills and bead mills. Devices having a different mechanism from these mills may also be used. When a bead mill is used as the wet grinding mill, the diameter of the beads is preferably 30 to 100 μm, and the rotational speed is preferably 6 to 12 m/s.

<<Fine Particulate Inorganic Oxide Dispersion>>

The fine particulate inorganic oxide dispersion of the present invention contains the following components (A) to (D):

(A) a fine particulate inorganic oxide, (B) a dispersant, (C) an alkoxysilane compound, and (D) a solvent having the following Hansen solubility parameters: a hydrogen bonding component (dH) of 11 or less and a polar component (dP) of 4 or more, wherein the ratio by weight of the dispersant (B) to the alkoxysilane compound (C) is 20:80 to 5:95. The components contained in the fine particulate inorganic oxide dispersion, the amounts thereof, and the production method are as described above for the method of producing a fine particulate inorganic oxide dispersion.

<<Resin Composition>>

The resin composition of the present invention contains the fine particulate inorganic oxide dispersion and a binder resin. The fine particulate inorganic oxide is preferably present in an amount of 30% by weight or more, more preferably 50% by weight or more, still more preferably 70% by weight or more, based on the solids in the resin composition. With an amount within the range indicated above, a desired refractive index can be provided to a cured product obtained by curing the resin composition.

Non-limiting examples of the binder resin include epoxy resins, polysiloxane resins, polyester resins, acrylic resins, urethane resins, polyolefin resins, and melamine. These may be used alone or in combinations of two or more.

Non-limiting examples of epoxy resins include bisphenol A epoxy resins, bisphenol F epoxy resins, phenol novolac epoxy resins; tetrakis(hydroxyphenyl)ethane or tris(hydroxyphenyl)methane epoxy resins which are polyfunctional epoxy resins containing a number of benzene rings; biphenyl epoxy resins, triphenolmethane epoxy resins, naphthalene epoxy resins, ortho novolac epoxy resins, dicyclopentadiene epoxy resins, aminophenol epoxy resins, alicyclic epoxy resins, and silicone epoxy resins. These may be used alone or in combinations of two or more.

Examples of polysiloxane resins include alkoxysilane oligomers in which alkoxysilane monomers represented by the formula (I) below are condensed and which contain one or more siloxane bonds (Si—O—Si) in one molecule.

$$SiR^1_4 \quad (I)$$

In the formula, each $R^1$ is hydrogen, a hydroxy group, a C1-C4 alkoxy group, an optionally substituted alkyl group, or an optionally substituted phenyl group, provided that at least one of the four $R^1$ groups is a C1-C4 alkoxy group or a hydroxy group. Preferred are polysiloxane resins in which two or more alkoxysilane molecules of formula (I) are condensed.

The polysiloxane resins may have any structure and may be linear or branched. Polysiloxane resins based on a single compound of formula (I) or a combination of two or more compounds of formula (I) may also be used.

Examples of the polysiloxane resins include silicon alkoxide resins such as silicon alkoxide acrylic resins, silicon alkoxide epoxy resins, silicon alkoxide vinyl resins, silicon alkoxide methacrylic resins, silicon alkoxide thiol resins, silicon alkoxide amino resins, silicon alkoxide isocyanate resins, silicon alkoxide alkyl resins, and silicon alkoxide resins free from functional groups other than silicon alkoxide groups.

Specific examples of constituents of the polysiloxane resins include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-mercaptopropylmethyldimethoxysilane, 3-mercaptopropyltrimethoxysilane, vinyltrimethoxysilane, vinyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-isocyanatopropyltriethoxysilane, methyltrimethoxysilane, dimethyldimethoxysilane, trimethylmethoxysilane, methyltriethoxysilane, methylphenoxysilane, n-propyltrimethoxysilane, diisopropyldimethoxysilane, isobutyltrimethoxysilane, diisobutyldimethoxysilane, isobutyltriethoxysilane, n-hexyltrimethoxysilane, n-hexyltriethoxysilane, cyclohexylmethyldimethoxysilane, n-octyltriethoxysilane, n-decyltrimethoxysilane; tetraalkoxysilanes such as tetramethoxysilane, tetraethoxysilane, tetrapropoxysilane, and tetrabutoxysilane; tetraphenoxysilanes, and alkoxy silicate oligomers such as methyl silicate oligomers and ethyl silicate oligomers. Preferred among these are tetraalkoxysilanes, tetraphenoxysilanes, and alkoxy silicate oligomers.

The polysiloxane resins may have any weight average molecular weight. The weight average molecular weight is preferably greater than 1000 but not greater than 5000, more preferably greater than 1300 but not greater than 3700, still more preferably from 1500 to 3500.

The polyester resins may be any polymer compound obtained by polycondensation of a compound containing two or more carboxyl groups in a molecule and a compound containing two or more hydroxy groups. Examples include polyethylene terephthalate, polytrimethylene terephthalate, polybutylene terephthalate, polyethylene naphthalate, and polybutylene naphthalate. These may be used alone or in combinations of two or more.

Non-limiting examples of acrylic resins include (meth) acrylic resins and vinyl ester resins. These acrylic resins may be, for example, polymers that contain, as constituent monomers, polymerizable monomers containing an acid group such as a carboxyl, acid anhydride, sulfonic acid, or phosphoric acid group. Examples of such polymers include homopolymers or copolymers of acid group-containing polymerizable monomers, and copolymers of acid group-containing polymerizable monomers with copolymerizable monomers. These may be used alone or in combinations of two or more.

As long as the (meth)acrylic resins contain (meth)acrylic monomers as main constituent monomers (e.g., 50 mol % or more), they may be ones polymerized with copolymerizable monomers. In such cases, it is sufficient that at least either the (meth)acrylic monomers or the copolymerizable monomers contain an acid group.

Examples of the (meth)acrylic resins include acid group-containing (meth)acrylic monomers (e.g., (meth)acrylic acids, sulfoalkyl (meth)acrylates, sulfonic acid group-containing (meth)acrylamides) and copolymers thereof, copolymers of (meth)acrylic monomers optionally containing an acid group with other polymerizable monomers containing an acid group (e.g., other polymerizable carboxylic acids, polymerizable polycarboxylic acids or anhydrides thereof, vinyl aromatic sulfonic acids) and/or copolymerizable monomers (e.g., alkyl (meth)acrylates, glycidyl (meth)acrylates, (meth)acrylonitriles, aromatic vinyl monomers), copolymers of other polymerizable monomers containing an acid group with (meth)acrylic copolymerizable monomers (e.g., alkyl (meth)acrylates, hydroxyalkyl (meth)acrylates, glycidyl (meth)acrylates, (meth)acrylonitriles), (meth)acrylic monomers free from acid groups (e.g., alkyl (meth)acrylates, aryl (meth)acrylates (fluorene (meth)acrylates)) and copolymers thereof, rosin-modified urethane acrylates, specially modified acrylic resins, urethane acrylates, epoxy acrylates, and urethane acrylate emulsions.

Preferred among these (meth)acrylic resins are (meth) acrylic acid-(meth)acrylate polymers (e.g., acrylic acid-methyl methacrylate copolymers) or (meth)acrylic acid-(meth)acrylate-styrene copolymers (e.g., acrylic acid-methyl methacrylate-styrene copolymers), for example.

The polyurethanes may be any polymer compound obtained by copolymerization of an isocyanate group-containing compound and a hydroxy group-containing compound. Examples include ester-ether polyurethanes, ether polyurethanes, polyester polyurethanes, carbonate polyurethanes, and acrylic polyurethanes. These may be used alone or in combinations of two or more.

Non-limiting examples of polyolefin resins include polyethylene, polypropylene, chlorinated polypropylene, maleic anhydride-modified polypropylene, and maleic anhydride-modified chlorinated polypropylene. These may be used alone or in combinations of two or more.

In order to obtain a cured product for optical use, thermosetting binder resins are preferred among the binder resins described above because they allow for easy control of optical properties. More preferred are thermosetting epoxy resins or polysiloxane resins. These binder resins may be used alone or in combinations of two or more.

The amount of binder resin used is not limited, but is preferably 5 to 100 parts by weight, more preferably 10 to 80 parts by weight, still more preferably 10 to 50 parts by weight, relative to 100 parts by weight of the fine particulate inorganic oxide. With an amount within the range indicated above, a uniform film can be formed without cracking during the film formation, and it has excellent optical properties.

<Optional Components>

The resin composition may optionally contain additional components in addition to the above-described components. Examples of such additional components include polymerization initiators, photosensitizers, solvents, leveling agents, surfactants, defoamers, neutralizers, antioxidants, release agents, and ultraviolet absorbers.

Examples of the polymerization initiators include photopolymerization initiators and free radical initiators.

Examples of the photopolymerization initiators include acetophenone compounds such as acetophenone, 2,2-diethoxyacetophenone, p-dimethylacetophenone, p-dimethylaminopropiophenone, dichloroacetophenone, trichloroacetophenone, and p-tert-butylacetophenone; benzophenone compounds such as benzophenone, 2-chlorobenzophenone, and p,p'-bisdimethylaminobenzophenone; benzyl, benzoin, benzoin ethers such as benzoin methyl ether, benzoin isopropyl ether, and benzoin isobutyl ether; benzyl dimethyl ketal, sulfur compounds such as thioxanthene, 2-chlorothioxanthene, 2,4-diethylthioxanthene, 2-methylthioxanthene, and 2-isopropylthioxanthene; anthraquinone compounds such as 2-ethylanthraquinone, octamethylanthraquinone, 1,2-benzanthraquinone, and 2,3-diphenylanthraquinone; azobisisobutyronitrile, organic peroxides such as benzoyl peroxide and cumene peroxide; and thiol compounds such as 2-mercaptobenzimidazole, 2-mercaptobenzoxazole, and 2-mercaptobenzothiazole. These compounds may be used alone or in combinations of two or more. The amount of photopolymerization initiator used is preferably 0.05 to 5.0 parts by weight, more preferably 0.1 to 3.0 parts by weight, relative to 100 parts by weight of the binder resin.

Examples of the free radical initiators include free radical initiators including, for example, ketone peroxide compounds, diacyl peroxide compounds, hydroperoxide compounds, dialkyl peroxide compounds, peroxyketal compounds, alkyl perester compounds, percarbonate compounds, and azobis compounds. These compounds may be used alone or in combinations of two or more. The amount of free radical initiator used is preferably 0.05 to 10.0 parts by weight, more preferably 0.1 to 5.0 parts by weight, relative to 100 parts by weight of the binder resin.

Any aqueous or organic solvent may be suitably used. Examples include aromatic hydrocarbon solvents such as toluene, ethylbenzene, trimethylbenzene, and xylene; aliphatic hydrocarbon solvents such as pentane, hexane, and cyclohexane; ketone solvents such as acetone, methyl ethyl ketone, methyl isobutyl ketone, and cyclohexanone; alcohol solvents such as methanol, ethanol, isopropanol, ethylene glycol, diethylene glycol, triethylene glycol, and propylene glycol; glycol ether solvents such as methyl cellosolve, ethyl cellosolve, butyl cellosolve, methyl diglycol, ethyl diglycol, butyl diglycol, and propylene glycol monomethyl ether; ester solvents such as ethyl acetate, butyl acetate, and propylene glycol monomethyl ether acetate; and water. Examples of commercial products that may be used as aromatic hydrocarbon solvents include SOLVESSO 100, SOLVESSO 150, and SOLVESSO 200. These may be used alone or in combinations of two or more.

The amount of solvent used is not limited and may be selected according to the application method or the desired thickness of the coating film. The amount of solvent used is preferably 10 to 5000 parts by weight, more preferably 20 to 2000 parts by weight, per 100 parts by weight of the solids in the resin composition. An amount of less than 10 parts by weight may lead to an increase in viscosity, preventing uniform application. An amount of more than 5000 parts by weight may prevent the formation of a sufficiently thick coating film and is not preferred from an economic standpoint and in view of the problem of excessive use of volatile organic compounds.

<<Cured Product>>

Characteristically, the cured product of the present invention is one obtained by curing the above resin composition. An example of such a cured product is a coating film obtained by applying the resin composition to a surface of a substrate and curing it. The resin composition of the present invention contains a fine particulate inorganic oxide dispersion in which a fine particulate inorganic oxide is sufficiently dispersed while reducing the amount of dispersant used. Thus, the coating film obtained by curing the resin composition has good optical properties and high reliability.

The coating film may be formed by any method. An example of the method includes applying the resin composition to at least a surface of a substrate and curing it with heating. The resin composition may be applied to the substrate surface by, for example, bar coating, spin coating, spray coating, dip coating, nozzle coating, gravure coating, reverse roll coating, die coating, air doctor coating, blade coating, rod coating, curtain coating, knife coating, transfer roll coating, squeeze coating, impregnation coating, kiss coating, calendar coating, or extrusion coating.

The applied resin composition may be cured under any conditions. The heating temperature is preferably 80 to 300° C., more preferably 90 to 120° C. The duration of heating is preferably 5 to 300 seconds, more preferably 20 to 120 seconds. A duration of heating of less than 5 seconds may cause curing failure. A duration of heating of more than 300 seconds may cause deformation of the substrate, depending on its material, and is not preferred from a productivity standpoint as the time required for the process increases.

The cured coating film may have any thickness. The thickness is preferably 0.1 to 30 μm, more preferably 0.3 to 20 μm. A coating film having a thickness of smaller than 0.1 μm may have insufficient smoothness. A coating film having a thickness of greater than 30 μm may have insufficient adhesion to the substrate due to the increased internal stress.

<Substrate>

Non-limiting examples of the material of the substrate include resins, inorganic materials, paper, and substrates for semiconductor fabrication such as silicon.

Examples of the resins include polyesters such as polyethylene terephthalate and polyethylene naphthalate; polyolefins such as polyethylene, polypropylene, and polymethylpentene; cycloolefins, polystyrene, polytetrafluoroethylene, PMMA, polyamides such as nylon 6 and nylon 66; polycarbonates, polyvinyl acetate, polyimides, and ABS resins. Among these, polyesters are preferred because of their economic efficiency and easy processability. Examples of the inorganic materials include glass, quartz, ceramics, metal substrates such as Ni, Cu, Cr, and Fe, and conductive substrates such as ITO.

The cured product can be suitably used as an optical coating film, an optical element, or a molded product in optical devices. Specific examples of the optical devices include organic EL lightings, organic EL displays, touch panels, liquid crystal displays, and CMOS image sensors.

EXAMPLES

The present invention is described below with reference to examples, but the present invention is not limited to these examples. Hereinafter, "parts" and "%" mean "parts by weight" and "% by weight", respectively, unless otherwise noted.

(1) Materials Used (1-1) Fine Particulate Inorganic Oxide

Zirconium oxide (Daiichi Kigenso Kagaku Kogyo Co., Ltd., UEP-50, average primary particle size: 20 nm)

Zirconium oxide (Daiichi Kigenso Kagaku Kogyo Co., Ltd., UEP-100, average primary particle size: 10 nm)

Titanium oxide (Nippon Aerosil Co., Ltd., P90, average primary particle size: 13 nm)

(1-2) Dispersant

Polyether phosphate dispersant (Kusumoto Chemicals, Ltd., DISPARLON PW-36, active ingredient: 50%)

(1-3) Alkoxysilane Compound

3-Methacryloxypropyltrimethoxysilane (Shin-Etsu Chemical Co., Ltd., KBM-503)

3-Glycidoxypropyltrimethoxysilane (Shin-Etsu Chemical Co., Ltd., KBM-403)

Phenyltrimethoxysilane (Shin-Etsu Chemical Co., Ltd., KBM-103)

(1-4) Solvent

Propylene glycol monomethyl ether acetate (Daicel Corporation, PGMEA)

Methyl isobutyl ketone (Showa Chemical Industry Co., LTD., MIBK)

Cyclopentanone (Zeon Corporation, CPN)

Propylene glycol monomethyl ether (Nippon Nyukazai Co., Ltd., PGME)

(1-5) Binder Resin

Fluorene acrylate (Osaka Gas Chemicals Co., Ltd., OGSOL EA-0250P)

Polysiloxane 1 (produced in Synthesis Example 1)

(1-6) Polymerization Initiator

Omnirad 127 (IGM Resins B.V.)

(1-7) Leveling Agent

BYK-301 (BYK Chemie)

The Hansen solubility parameters of the solvents are shown in Table 1.

TABLE 1

| Solvent | HSP value | | |
|---|---|---|---|
| | δ D | δ P | δ H |
| PGMEA | 15.6 | 5.6 | 9.8 |
| MIBK | 15.3 | 6.1 | 4.1 |
| CPN | 17.9 | 11.9 | 5.2 |
| PGME | 15.6 | 6.3 | 11.6 |
| CPN/PGME = 50/50 | 16.7 | 9.1 | 8.4 |

Here, CPN/PGME refers to a solvent mixture of cyclopentanone and propylene glycol monomethyl ether in a ratio of 50:50 (by weight).

(2) Examples 1 to 11 and Comparative Examples 1 to 3

The fine particulate inorganic oxide, dispersant, alkoxysilane compound(s), and solvent(s) in amounts shown in Table 2 were mixed. Subsequently, the mixture was dispersed with a media disperser (bead mill) to give a fine particulate inorganic oxide dispersion. The bead mill was used under the following processing conditions: a total weight of the mixture charged of 350 g; a bead diameter of 50 μm; a rotational speed of 10 m/s; and a dispersing time of 180 minutes.

The average particle size and storage stability of the fine particulate inorganic oxide in the resulting dispersion were measured by the methods described below. Table 2 shows the results. In Table 2, the amounts of the dispersant, alkoxysilane compounds, and solvents are expressed in parts by weight relative to 100 parts by weight of the fine particulate inorganic oxides.

(3) Method of Evaluating Fine Particulate Dispersion (3-1) Average Particle Size The Z-average particle size of the dispersions of the examples and comparative examples was calculated based on the scattering intensity distribution determined by dynamic light scattering using Zetasizer Nano ZS available from Malvern.

(3-2) Storage Stability

The dispersions of the examples and comparative examples were allowed to stand for a day after the production and then visually evaluated for fluidity. Dispersions with the same fluidity as immediately after the production were evaluated as "Good". In Comparative Examples 1 to 3, precipitation occurred and the storage stability could not be evaluated.

ysilanes. A 20% by weight sodium hydroxide aqueous solution was added dropwise in an amount of 0.05 equivalents relative to the combined amount of the alkoxysilanes, and the mixture was heated at 60° C. for three hours. Water was added to the reaction solution and then removed therefrom. This liquid-liquid extraction operation was performed three times. The resulting solution was dehydrated with sodium sulfate, followed by concentration in an evaporator to give a polysiloxane 1. The polysiloxane 1 was subjected to molecular weight analysis by GPC and found to have a weight average molecular weight of 3300.

(5) Production Example 1 (Production of Fine Particulate Inorganic Oxide Dispersion)

The following components were mixed: 100 parts by weight of UEP-50 as a fine particulate inorganic oxide; 10 parts by weight of PW-36 as a dispersant; 10 parts by weight of KBM-503 as an alkoxysilane compound; and 120 parts by weight of PGME as a solvent. Subsequently, the mixture was dispersed with a media disperser (bead mill) to give a fine particulate inorganic oxide dispersion. The bead mill was used under the following processing conditions: a total weight of the mixture charged of 350 g; a bead diameter of 50 μm; a rotational speed of 10 m/s; and a dispersing time of 180 minutes. The fine particulate inorganic oxide dispersion had an average particle size of 40 nm and, after being

TABLE 2

| | | | Example | | | | | | | | | | | Comparative Example | | |
|---|---|---|---|---|---|---|---|---|---|---|---|---|---|---|---|---|
| | | | 1 | 2 | 3 | 4 | 5 | 6 | 7 | 8 | 9 | 10 | 11 | 1 | 2 | 3 |
| Composition | Fine particulate inorganic oxide | UEP-50 | 100 | 100 | 100 | 100 | 100 | 100 | | | | 100 | 100 | 100 | 100 | 100 |
| | | UEP-100 | | | | | | | 100 | | | | | | | |
| | | P90 | | | | | | | | 100 | 100 | | | | | |
| | Dispersant | PW-36 | 2 | 2 | 2 | 2 | 2 | 2 | 2 | 2 | 2 | 2 | 2 | | 2 | 2 |
| | Alkoxysilane | KBM-503 | 10 | 20 | 20 | 20 | 10 | | 20 | 20 | | 20 | 20 | 20 | | 20 |
| | | KBM-403 | | | | | | 20 | | | 10 | | | | | |
| | | KBM-103 | | | | | 10 | | | | 10 | | | | | |
| | Solvent | PGMEA | 112 | 122 | | | | | 122 | 122 | | 32 | 550 | 120 | 102 | |
| | | MIBK | | | 122 | | | | | | | | | | | |
| | | CPN | | | | 122 | 122 | 61 | | | 122 | | | | | |
| | | PGME | | | | | | 61 | | | | | | | | 122 |
| Property | Average particle size (nm) | | 40 | 30 | 33 | 30 | 37 | 30 | 28 | 40 | 40 | 35 | 28 | >1000 | 190 | >1000 |
| | Storage stability (fluidity after a day) | | Good | Good | Good | Good | Good | Good | Good | Good | Good | Good | Good | — | — | — |

As shown in Table 2, the fine particulate inorganic oxides in the dispersions of Examples 1 to 11 had an average particle size of 40 nm or less, indicating sufficient dispersibility. They also exhibited good storage stability. In Comparative Example 1 containing no dispersant, Comparative Example 2 containing no alkoxysilane compound, and Comparative Example 3 not satisfying the solvent requirements, the fine particulate inorganic oxide could not be sufficiently dispersed and had a large average particle size. Precipitation occurred in Comparative Examples 1 to 3.

(4) Synthesis Example 1 (Synthesis of Binder Resin)

3-Methacryloxypropyltrimethoxysilane (Shin-Etsu Chemical Co., Ltd., KBM-503) and phenyltrimethoxysilane (Shin-Etsu Chemical Co., Ltd., KBM-103) were mixed in a molar ratio of 90:10. The mixture was diluted with MIBK to 50% by weight, and water was added in an amount of three equivalents relative to the combined amount of the alkoxallowed to stand for a day after the production, exhibited the same fluidity as immediately after the production.

(6) Examples 12 to 18 and Comparative Examples 4 and 5

The components shown in Table 3 were mixed to give a coating resin composition. The amounts shown in Table 3 are expressed in weight ratios, and the amounts of the components other than the solvent are expressed as solids. The coating resin composition was applied to a glass substrate using a bar coater (No. 8) and cured by heating in a hot air dryer at 110° C. for 40 seconds. Thus, a 8 μm-thick coating film was formed to prepare an element. The element was cooled to room temperature and used as a specimen. The specimen was evaluated for coating film appearance, refractive index, total light transmittance, haze value, and coating film appearance after reliability testing by the below-described methods. The evaluation results are shown in Table 3.

(7) Methods of Evaluating Coating Film

(7-1) Coating Film Appearance

The condition of the coating film of the prepared specimen was visually observed and evaluated based on the following criteria:

Good: a uniform coating film without unevenness and agglomeration;

Blushing: fine particles locally agglomerated and blushing occurred.

(7-2) Refractive Index

The prepared specimen was analyzed for refractive index at 550 nm using a spectroscopic ellipsometer (J. A. Woollam Japan, M-2000C).

(7-3) Total Light Transmittance, Haze Value

The prepared specimen was analyzed for total light transmittance and haze value according to JIS K 7150 using a haze computer (Suga Test Instruments Co., Ltd., HGM-2B).

(7-4) Evaluation of Coating Film Appearance after Reliability Testing

The prepared specimen was exposed to a temperature of 85° C. and a relative humidity of 85% in a moist heat oven for 500 hours. Thereafter, the coating film appearance was observed to determine the presence of cracks.

TABLE 3

|  |  |  | Example |  |  |  |  |  |  | Comparative Example |  |
|---|---|---|---|---|---|---|---|---|---|---|---|
|  |  |  | 12 | 13 | 14 | 15 | 16 | 17 | 18 | 4 | 5 |
| Composition | Fine particulate dispersion | Example 1 | 200 |  |  |  |  |  |  |  |  |
|  |  | Example 2 |  | 200 | 200 | 200 |  |  |  |  |  |
|  |  | Example 7 |  |  |  |  | 200 |  |  |  |  |
|  |  | Example 8 |  |  |  |  |  | 200 | 200 |  |  |
|  |  | Comparative Example 2 |  |  |  |  |  |  |  | 200 |  |
|  |  | Production Example 1 |  |  |  |  |  |  |  |  | 200 |
|  | Binder resin | Polysiloxane 1 | 24 | 14 | 30 | 64 |  | 24 | 24 | 13 | 16 |
|  |  | OGSOL EA-0250P |  |  |  |  | 64 |  |  |  |  |
|  | Polymerization initiator | Omnirad 127 | 2 | 2 | 2 | 2 | 2 | 2 | 2 | 2 | 2 |
|  | Leveling agent | BYK-301 | 0.1 | 0.1 | 0.1 | 0.1 | 0.1 | 0.1 | 0.1 | 0.1 | 0.1 |
|  | Solvent | PGMEA | 26.1 | 16.1 | 32.1 | 66.1 | 66.1 | 26.1 | 26.1 | 18.1 | 18.1 |
| Property | Coating film appearance |  | Good | Good | Good | Good | Good | Good | Good | Blushing | Good |
|  | Refractive index |  | 1.78 | 1.78 | 1.72 | 1.67 | 1.69 | 1.9 | 1.92 | N.A. | 1.76 |
|  | Total light transmittance |  | 95.1 | 95.4 | 96.5 | 97.3 | 97.0 | 92.3 | 92.0 | 86.8 | 95.7 |
|  | Haze value |  | 0.2 | 0.1 | 0.1 | 0.1 | 0.1 | 0.2 | 0.1 | 48.6 | 0.2 |
|  | Coating film appearance after reliability testing |  | Good | Good | Good | Good | Good | Good | Good | — | Cracked |

Table 3 shows that, in each of Examples 12 to 18, a good coating film was formed on the substrate and the coating film had high durability as well as good refractive index, total light transmittance, and haze value. In Comparative Example 4 using a fine particulate dispersion containing no alkoxysilane compound, the fine particulate inorganic oxide could not be sufficiently dispersed, and therefore the resulting coating film exhibited blushing and had poor optical properties. In Comparative Example 5, a coating film was formed, but the coating film had low reliability because a large amount of dispersant was contained in the fine particulate dispersion of Production Example 1 used.

The invention claimed is:

1. A resin composition, comprising:
    a fine particulate inorganic oxide dispersion, comprising the following components (A) to (D):
    (A) at least one fine particulate inorganic oxide selected from the group consisting of zirconium oxide ($ZrO_2$), titanium oxide ($TiO_2$), and barium titanate ($BaTiO_3$),
    (B) at least one dispersant selected from phosphoric acid dispersants,
    (C) an alkoxysilane compound,
    (D) a solvent having the following Hansen solubility parameters: a hydrogen bonding component (dH) of 11 or less and a polar component (dP) of 4 or more; and
    a binder resin,
    wherein an amount of the at least one dispersant (B) is 0.25 to 8 parts by weight relative to 100 parts by weight of the at least one fine particulate inorganic oxide (A),
    a ratio by weight of the at least one dispersant (B) to the alkoxysilane compound (C) is 20:80 to 5:95, and
    wherein a sum of the at least one dispersant (B) and the alkoxysilane compound (C) is 5 to 40 parts by weight relative to 100 parts by weight of the at least one fine particulate inorganic oxide (A),
    wherein the resin composition is obtained by:
    (i) wet grinding the mixture of the components (A) to (D) to obtain the fine particulate inorganic oxide dispersion, and
    (ii) adding the binder resin to the fine particulate inorganic oxide dispersion.

2. The resin composition according to claim 1, wherein the at least one fine particulate inorganic oxide is present in an amount of 30% by weight or more based on solids in the resin composition.

3. The resin composition according to claim 1, wherein no solvent replacement is performed after the (i) wet grinding.

4. A cured product, obtained by curing the resin composition according to claim 1.

5. A method of producing a fine particulate inorganic oxide dispersion, the method comprising:
    mixing the following components (A) to (D):
    (A) at least one fine particulate inorganic oxide selected from the group consisting of zirconium oxide ($ZrO_2$), titanium oxide ($TiO_2$), and barium titanate ($BaTiO_3$),
    (B) at least one dispersant selected from phosphoric acid dispersants,
    (C) an alkoxysilane compound, and
    (D) a solvent having the following Hansen solubility parameters: a hydrogen bonding component (dH) of 11 or less and a polar component (dP) of 4 or more; and
    wet grinding the resulting mixture, wherein a sum of the at least one dispersant (B) and the alkoxysilane compound (C) is 5 to 40 parts by weight relative to 100 parts by weight of the at least one fine particulate inorganic oxide (A), the at least one fine particulate inorganic oxide (A), the at least one dispersant (B), and the alkoxysilane compound (C) are added all at once to the solvent (D), an amount of the at least one dispersant (B) is 0.25 to 8 parts by weight relative to 100 parts by weight of the at least one fine particulate inorganic oxide (A), and a ratio by weight of the at least one dispersant (B) to the alkoxysilane compound (C) is 20:80 to 5:95.

6. A method of producing a fine particulate inorganic oxide dispersion according to claim 5, wherein the hydrogen bonding component (dH) of Hansen solubility parameter of the solvent (D) is 5.2 or more.

* * * * *